US007148262B2

(12) United States Patent
Danner et al.

(10) Patent No.: US 7,148,262 B2
(45) Date of Patent: Dec. 12, 2006

(54) METHOD FOR DRYING AND USING SWARF IN GOLF BALLS

(75) Inventors: Richard S. Danner, Tiverton, RI (US); Richard K. Brown, Portsmouth, RI (US); Samuel A. Pasqua, Jr., Tiverton, RI (US)

(73) Assignee: Acushnet Company, Fairhaven, MA (US)

( * ) Notice: Subject to any disclaimer, the term of this patent is extended or adjusted under 35 U.S.C. 154(b) by 53 days.

(21) Appl. No.: 10/770,480

(22) Filed: Feb. 4, 2004

(65) Prior Publication Data

US 2005/0171221 A1 Aug. 4, 2005

(51) Int. Cl.
A63B 37/00 (2006.01)
A63B 37/06 (2006.01)
A63B 37/12 (2006.01)
C08L 17/00 (2006.01)

(52) U.S. Cl. .................. 521/41; 521/45; 525/193; 525/236; 525/274; 473/371; 473/374; 473/377; 473/378

(58) Field of Classification Search .............. 521/41, 521/45; 525/193, 236, 274; 473/371, 374, 473/377
See application file for complete search history.

(56) References Cited

U.S. PATENT DOCUMENTS

| | | | |
|---|---|---|---|
| 4,560,168 A | 12/1985 | Aoyama | 273/232 |
| 4,925,193 A | 5/1990 | Melvin et al. | 273/232 |
| 4,960,281 A | 10/1990 | Aoyama | 273/232 |
| 5,006,297 A | 4/1991 | Brown et al. | 264/234 |
| 5,248,878 A | 9/1993 | Ihara | 219/121.69 |
| 5,249,804 A | 10/1993 | Sanchez | 273/232 |
| 5,334,673 A | 8/1994 | Wu | 273/235 R |
| 5,403,453 A | 4/1995 | Roth et al. | 204/164 |
| 5,456,972 A | 10/1995 | Roth et al. | 428/224 |
| 5,484,870 A | 1/1996 | Wu | 528/28 |
| 5,508,350 A * | 4/1996 | Cadorniga et al. | 525/193 |
| 5,562,552 A | 10/1996 | Thurman | 473/379 |
| 5,575,477 A | 11/1996 | Hwang | 473/379 |
| 5,688,191 A | 11/1997 | Cavallaro et al. | 473/373 |
| 5,713,801 A | 2/1998 | Aoyama | 473/354 |
| 5,733,206 A * | 3/1998 | Nesbitt et al. | 473/377 |
| 5,733,428 A | 3/1998 | Calabria et al. | 264/134 |
| 5,803,831 A | 9/1998 | Sullivan et al. | 473/374 |
| 5,820,488 A | 10/1998 | Sullivan et al. | 473/374 |
| 5,849,168 A | 12/1998 | Lutz | 264/755 |
| 5,885,172 A | 3/1999 | Hebert et al. | 473/354 |
| 5,919,100 A | 7/1999 | Boehm et al. | 473/354 |
| 5,947,842 A * | 9/1999 | Cavallaro et al. | 473/373 |
| 5,957,787 A | 9/1999 | Hwang | 473/379 |
| 5,965,669 A | 10/1999 | Cavallaro et al. | 525/221 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,075,223 A | 6/2000 | Harrison | 219/121.85 |
| 6,096,255 A | 8/2000 | Brown et al. | 264/248 |
| 6,129,881 A | 10/2000 | Puniello | 264/278 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,207,784 B1 | 3/2001 | Rajagopalan | 528/71 |
| 6,213,898 B1 | 4/2001 | Ogg | 473/383 |
| 6,235,230 B1 | 5/2001 | Puniello | 264/278 |
| 6,290,615 B1 | 9/2001 | Ogg | 473/378 |
| 6,290,797 B1 | 9/2001 | Gosetti et al. | 156/228 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,379,138 B1 | 4/2002 | Puniello et al. | 425/116 |
| 6,383,092 B1 | 5/2002 | Ogg | 473/378 |
| 6,409,615 B1 | 6/2002 | McGuire et al. | 473/383 |
| 6,462,303 B1 | 10/2002 | Brown | 219/121.69 |
| 6,629,898 B1 | 10/2003 | Nardacci | 473/373 |
| 6,705,959 B1 | 3/2004 | Morgan et al. | 473/383 |
| 2001/0009310 A1 | 7/2001 | Herbert et al. | |
| 2001/0018375 A1 | 8/2001 | Hayashi et al. | |
| 2001/0019971 A1 | 9/2001 | Hayashi et al. | |
| 2002/0025862 A1 | 2/2002 | Sullivan et al. | |
| 2002/0028885 A1 | 3/2002 | Sullivan et al. | |
| 2002/0082358 A1 | 6/2002 | Ohira et al. | |
| 2002/0160862 A1 | 10/2002 | Morgan et al. | |
| 2004/0262804 A1 * | 12/2004 | Sullivan et al. | 264/126 |
| 2004/0266556 A1 * | 12/2004 | Sullivan et al. | 473/367 |

OTHER PUBLICATIONS

U.S. Appl. No. 10/167,744 filed Jun. 13, 2002 entitled "Golf Ball With Multiple Cover Layers".
U.S. Appl. No. 10/138,304 filed May 6, 2002 entitled "Golf Ball Incorporating Grafted Metallocene Catalyzed Polymer Blends".
U.S. Appl. No. 10/012,538 filed Dec. 12, 2001 entitled "Method of Forming Indicia on a Golf Ball".
U.S. Appl. No. 09/989,191 filed Nov. 21, 2001 entitled "Golf Ball Dimples with a Catenary Curve Profile".
U.S. Appl. No. 09/842,829 filed Apr. 27, 2001 entitled "All Rubber Golf Ball With Hoop-Stress Layer".

(Continued)

Primary Examiner—David J. Buttner
(74) Attorney, Agent, or Firm—Bingham McCutchen LLP

(57) ABSTRACT

The present invention relates to an apparatus and method for reusing waste material generated during the manufacturing of golf ball cores. More specifically, the present invention relates to a method and apparatus for drying the waste material in order lower its moisture content. In addition, the present invention relates to golf balls and golf ball components that utilize waste material, and in particular swarf.

13 Claims, No Drawings

OTHER PUBLICATIONS

U.S. Appl. No. 09/742,435 filed Dec. 22, 2000 entitled "Split Vent Pin for Injection Molding".
U.S. Appl. No. 09/717,136 filed Nov. 22, 2000 entitled "Method of Making Golf Balls".
U.S. Appl. No. 09/442,845 filed Nov. 18, 1999 entitled "Mold for a Golf Ball".

* cited by examiner

METHOD FOR DRYING AND USING SWARF IN GOLF BALLS

FIELD OF THE INVENTION

The present invention relates to an apparatus and method for reusing waste material generated during the manufacturing of golf ball cores. More specifically, the present invention relates to a method and apparatus for drying the waste material in order lower its moisture content. In addition, the present invention relates to golf balls and golf ball components that utilize waste material, and in particular swarf.

BACKGROUND OF THE INVENTION

Golf balls typically contain materials that are difficult to recycle. In particular, golf balls contain thermoset materials which, like rubber in tires, do not degrade and pose serious threats to the environment. In 1844, Charles Goodyear obtained U.S. Pat. No. 3,633 directed to sulfur vulcanization and further stated that "[n]o degree of heat, without blaze can melt it. . . . It resists the most powerful chemical reagents." Although Goodyear's sulfur vulcanization provided a significant breakthrough to the industrial revolution, he also created one of the most difficult materials to recycle. There have been many efforts to develop methods of recycling and reclaiming rubber, especially in view of the increasing amount of scrap rubber produced by items, such as tires.

Approximately 30% of waste generated in golf ball manufacturing is rubber swarf, a by-product formed when a rubber core component is shaved to obtain a required dimension. The process contaminates the rubber with water, which currently precludes recovery or reuse of this material. This consequently leads to millions of tons of unusable waste that is expensive to dispose.

However, there is no method to date that processes and utilize swarf in golf balls, or other articles that are generally manufactured from rubber materials. Thus, a need exists for the use of swarf in golf balls, as well as a process to recover, dry and reuse swarf as a component in the production of golf ball components.

SUMMARY OF THE INVENTION

The present invention encompasses a golf ball comprising swarf. The swarf may be present in the amount from about 0.1 weight percent to about 100 weight percent, preferably from about 1 weight percent to about 40 weight percent. The golf ball may comprise one or more of a core, and cover, wherein the swarf is disposed in at least a portion of the core, cover, or a combination thereof. In one embodiment, the golf ball further comprises one or more intermediate layer, wherein the swarf is disposed in at least a portion of the core, intermediate layer, cover, or a combination thereof.

In one embodiment, the swarf comprises a thermoset material. In particular, the thermoset material is selected from the group consisting of a thermoset natural or synthetic rubber, thermoset polyurethane, thermoset polyurea, thermoset polyolefin, thermoset phenol-formaldehyde resin, thermoset amino resin, thermoset furan resin, thermoset unsaturated polyester resin, thermoset vinyl ester resin, thermoset cyanate esters, thermoset acrylic resins, thermoset epoxy resin, thermoset silicones, thermoset polyimides, and mixtures thereof. In one embodiment, the crosslinked thermoset material is selected from the group consisting of styrene butadiene; polybutadiene; isoprene; polyisoprene; trans-isoprene; ethylene propylenediene rubber; fluoroelastomer; silicone rubber; epoxy rubber; nadimide-, cyanate- or maleimide-terminated thermosetting polyimides; and mixtures thereof.

Typically, the golf ball has an Atti compression of at least about 40 and has a coefficient of restitution of at least about 0.7. The golf ball may also have a specific gravity of at least about 0.7.

In one embodiment, the golf ball has an initial velocity of about 245 ft/s or greater. In another embodiment, the golf ball has an initial velocity of about 253 ft/s to about 254 ft/s.

In another embodiment, the golf ball has a ball spin rate of about 1200 rpm to about 4000 rpm when the golf ball is hit with a golf driver. In yet another embodiment, the golf ball has a ball spin rate of about 6500 rpm to about 10,000 rpm when the golf ball is hit with an 8-iron.

In one embodiment, the flexural modulus of the intermediate layer is from about 500 psi to about 500,000 psi and the flexural modulus of the cover is from about 500 psi to about 150,000 psi. In another embodiment, the core has a hardness of about 20 to Shore C to about 80 Shore D, and the cover has a hardness of about 20 Shore A to about 70 Shore D. In yet another embodiment, the intermediate layer has a hardness of about 30 Shore D or greater.

In one embodiment, the golf ball further comprises a filler comprising at least one density adjusting filler. Preferably, the density adjusting filler is a metal powder or metal oxide.

The present invention is also directed to a method of manufacturing a golf ball comprising the steps of: providing a core; optionally providing one or more intermediate layers disposed outside the core; and providing at least one cover over the core and optional intermediate layer, wherein the at least one of the cover, the core, and the optional intermediate layer comprises from about 0.1 weight percent to about 100 weight percent of swarf. In one embodiment, the swarf comprises a thermoset material.

In one embodiment, the swarf is provided by the steps of providing swarf-containing material and contacting the swarf containing-material with a hot gas stream for a sufficient amount of time to dry the swarf to a desired moisture level. In one embodiment, the swarf-containing material is moved to a hopper to be metered, then conveyed to a stream of hot gas that carries it into a drying chamber having a dust collector. In another embodiment, the stream of hot gas may flow continuously or periodically through the dust collector and vented out into the atmosphere. In yet another embodiment, the dried swarf collects onto the surface of the dust collector and then conveyed to a storage area before being utilized in the manufacture of golf ball components.

The gas utilized in the stream of hot gas may be air, an inert gas, or mixtures thereof. In particular, the inert gas may be nitrogen, argon, helium or a mixture thereof. In one embodiment, the temperature of the stream of hot gas is between about 30° C. to about 120° C. In another embodiment, the flow rate of the gas stream is between about 60 to about 3500 SCFM.

In one embodiment, the swarf-containing waste materials and swarf are contacted with the stream of hot gases for a time sufficient to dry the swarf. In another embodiment, the swarf-containing waste materials and swarf are contacted with the stream of hot gases from between about 1 to about 72 hours. In yet another embodiment, the swarf-containing waste materials and swarf are contacted with the stream of hot gases from between about 12 to about 48 hours.

Typically, the recovered and dried swarf has a moisture content below about 5.0 weight percent. In another embodiment, the recovered and dried swarf has a moisture content of below about 0.50 weight percent.

DETAILED DESCRIPTION OF THE INVENTION

The present invention relates to golf balls including swarf. In particular, the present invention encompasses the use of swarf and forming new golf ball components therefrom. Swarf includes waste material generated when rubber articles, such as golf ball components, are shaved to their desired dimensions, wherein such waste material comprises cured or crosslinked thermoset material. The invention also encompasses methods of drying and reusing swarf for making golf balls. In particular, swarf is dried to a desired moisture level prior to being utilized as a component, such as a polymer component or a filler, in golf ball manufacturing. In one embodiment, swarf that is recovered and dried are recycled and reintroduced into the golf ball manufacturing process In another embodiment, high-pressure, high temperature sintering ("HPHTS") is utilized to fuse and re-crosslink swarf, optionally along with other crosslinkable material, into swarf-containing products that are comparable, or even indistinguishable from the original products in terms of performance.

Swarf may be used in any type of ball construction. For example, the ball may have a one-piece, two-piece, or three-piece design, a multi-layer core, a multi-layer cover, one or more intermediate layers. As used herein, the term "multi-layer" means at least two layers. For example, the swarf-containing products may be used in a core, intermediate layer, and/or cover of a golf ball, each of which may have a single layer or multiple layers. Thus, the invention encompasses golf balls that comprise at least one layer formed from swarf. As used herein, the term "layer" includes any generally spherical portion of a golf ball, i.e., a golf ball core or center, an intermediate layer, and or a golf ball cover.

In one embodiment, a golf ball core includes swarf. In another embodiment, a golf ball having more than one layer in the core includes swarf in at least one of the core layers. In another embodiment, a golf ball intermediate layer includes swarf. In another embodiment, a golf ball having more than one intermediate layer includes swarf in at least one of the intermediate layers. In yet another embodiment, a golf ball cover includes swarf. In another embodiment, a golf ball having more than one cover includes swarf in at least one of the cover layers.

The present invention encompasses golf balls in which a portion of the golf balls is formed from swarf. In particular, the core, intermediate layer, if present, and/or cover may be partially formed from swarf, for example by re-crosslinking swarf, alone or in combination with conventional golf ball starting materials. Thus in one embodiment, the core, intermediate layer, if present, and/or cover comprises from about 0.1 weight percent to about 100 weight percent of swarf, preferably from about 1 weight percent to about 75 weight percent of swarf, more preferably from about 3 weight percent to about 50 weight percent of swarf. In another embodiment, the core, intermediate layer, if present, and/or cover comprises from about 5 weight percent to about 40 weight percent of swarf, preferably from about 10 weight percent to about 25 weight percent of swarf, more preferably from about 15 weight percent to about 20 weight percent of swarf. The upper and lower limits of the ranges disclosed herein are interchangeable to form new ranges. Accordingly, the present invention also encompasses a golf having a core, intermediate layer, if present, and/or cover that comprises from about 0.1 weight percent to about 25 weight percent of swarf, preferably from about 1 weight percent to about 15 weight percent of swarf, more preferably from about 3 weight percent to about 10 weight percent of swarf.

The present invention also encompasses golf balls made entirely from swarf. In particular, the core, intermediate layer, if present, and/or cover may be completely formed from swarf, for example by re-crosslinking swarf, alone or in combination with conventional golf ball starting materials. In embodiments where golf ball components (i.e., core (s), intermediate layer(s) or cover(s)) either are not entirely comprised of swarf or do not contain swarf, conventional materials typically used to form such components may be utilized, as discussed below.

In one embodiment, swarf generated during the manufacture of one golf ball component may be used to make a swarf-containing product for the same component. As discussed above, swarf is generated during the golf ball manufacturing process, particularly where a golf ball component is shaved or subject to grinding, e.g., in a Glebar core grinding operation, to further shape the golf ball component into desired dimensions. For example, swarf generated during the manufacture of a golf ball core may be dried and reused to form a new swarf-containing material for use in a new golf ball core. Likewise, swarf generated during the manufacture of a golf ball intermediate layer may be dried and reused to form a swarf-containing product for a new intermediate layer.

In another embodiment, swarf generated during the manufacture of one golf ball component may be used to make a swarf-containing product for a different golf ball component. For example, swarf generated during the manufacture of a golf ball core may be dried and reused to form a new intermediate layer or cover. Swarf generated during the manufacture of a golf ball intermediate layer may be dried and reused to form a new core or cover.

In one embodiment, swarf is generated from one or more rubber articles that comprise thermoset material, which includes, but is not limited to, thermoset natural or synthetic rubber, thermoset polyurethane, thermoset polyurea, thermoset polyolefin, thermoset phenol-formaldehyde resin, thermoset amino resin, thermoset furan resin, thermoset unsaturated polyester resin, thermoset vinyl ester resin, thermoset cyanate esters, thermoset acrylic resins, thermoset epoxy resin, thermoset silicones, thermoset polyimides, or mixtures thereof. In particular, the thermoset material includes, but is not limited to, styrene butadiene; polybutadiene, including cis-polybutadiene, trans-polybutadiene, and blends thereof, as well as cis-to-trans converted polybutadiene; isoprene; polyisoprene; trans-isoprene (including Balata); ethylene propylenediene rubber; fluoroelastomer; silicone rubber; epoxy rubber; nadimide-, cyanate- or maleimide-terminated thermosetting polyimides; or mixtures thereof.

The present invention encompasses the use of swarf that comprises a resilient polymer component, such as polybutadiene. Examples of polybutadiene include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. In one embodiment, the polybutadiene also can be mixed with other elastomers known in the art such as natural rubber, polyisoprene rubber and/or styrene-butadiene. The polybutadiene typically has a molecular weight of greater than about 200,000. Preferably, the polybutadiene molecular weight is greater than about 250,000, more preferably between about 300,000 and 500,000.

In another embodiment, the swarf further comprises a cis-to-trans catalyst, such as those described in copending U.S. application Ser. Nos. 10/437,386 and 10/437,387, the entirety of which are incorporated herein by reference. Without being bound by any particular theory, it is believed that the cis-to-trans catalyst component, in conjunction with a free radical source, acts to convert a percentage of the polybutadiene from the cis- to the trans-conformation. As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component (including metal-containing and nonmetal-containing organosulfur compounds), a Group VIA component, an inorganic sulfide, a substituted or unsubstituted aromatic organic compound that does not contain sulfur or metal, an aromatic organometallic compound, or any combination thereof. In one embodiment, the cis-to-trans catalyst is a blend of an organosulfur component and an inorganic sulfide component or a Group VIA component. In another embodiment, the cis-to-trans catalyst is a blend of an organosulfur component, an inorganic sulfide component, and a Group VIA component.

When elemental sulfur or polymeric sulfur is included in the cis-to-trans catalyst, an accelerator may be used to improve the performance of the cis-to-trans catalyst and increase the trans-conversion for a given amount of sulfur catalyst. Suitable accelerators include, but are not limited to, sulfenamide, such as N-oxydiethylene 2-benzothiazolesulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

The cis-to-trans catalyst is typically present in an amount sufficient to produce a reaction product so as to increase the trans-polybutadiene isomer content to contain from about 5 percent to 70 percent trans-isomer polybutadiene based on the total resilient polymer component. The cis-to-trans catalyst is preferably present in an amount from about 0.1 pph to 25 pph of the total amount of polybutadiene.

As mentioned above, the cis-to-trans catalyst is utilized in conjunction with a free radical. The free-radical source is typically a peroxide, and preferably an organic peroxide, which decomposes during the cure cycle. Suitable free-radical sources include organic peroxide compounds, such as di-tert-amyl peroxide, di(2-tert-butyl-peroxyisopropyl) benzene peroxide or α,α-bis(tert-butylperoxy) diisopropylbenzene, 1,1-bis(tert-butylperoxy)-3,3,5-trimethylcyclohexane or 1,1-di(tert-butylperoxy) 3,3,5-trimethyl cyclohexane, dicumyl peroxide, di-tert-butyl peroxide, 2,5-di-(tert-butylperoxy)-2,5-dimethyl hexane, n-butyl-4,4-bis(tert-butylperoxy)valerate, lauryl peroxide, benzoyl peroxide, tert-butyl hydroperoxide, and the like, and any mixture thereof.

Other examples include, but are not limited to, VAROX® 231XL and VAROX® DCP-R, commercially available from Atofina Chemicals, Inc. of King of Prussia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

The peroxide may be present in an amount greater than about 0.1 pph of the total resilient polymer component, preferably about 0.1 pph to about 15 pph of the resilient polymer component.

The swarf may also include a crosslinking agent, including one or more metallic salts of unsaturated fatty acids having 3 to 8 carbon atoms, such as acrylic or methacrylic acid, or monocarboxylic acids, including zinc, calcium, or magnesium acrylate salts, and the like, and mixtures thereof. Exemplary crosslinkers include, but are not limited to, one or more metal salt diacrylates, dimethacrylates, and monomethacrylates, wherein the metal is magnesium, calcium, zinc, aluminum, sodium, lithium, or nickel.

The presence of one or more of a cis-to-trans catalyst, free radical, or crosslinking agent affects the properties of the swarf and may be a factor when HPHTS is utilized to re-crosslink swarf or swarf in the presence other conventional materials used to manufacture golf balls. Thus, the absence or presence of these additional components in swarf will be a factor in determining the HPHTS conditions, such as the pressure, temperature and/or time.

Another aspect of the invention encompasses a method of and apparatus for recovering and drying swarf from waste materials generated during the manufacture of golf balls, particularly when golf ball components are shaved or subject to grinding to form golf ball components. Thus, the present invention encompasses an apparatus for recovering and drying swarf comprising a source of gas, a heating source to heat the gas, and drying chamber having a dust collector. Optionally, a hopper is placed before the drying chamber and is utilized to initially hold and meter a desired amount of waste material containing swarf. A conveyor or trough, which facilitates conveyance of the swarf-containing waste material from the hopper to the drying chamber, may be connected between the hopper and drying chamber. A storage unit may also be connected to and placed after the drying chamber. The hopper may be any shape and of sufficient size to initially hold and meter the swarf-containing waste material and may readily be determined by one of ordinary skill in the art. The drying chamber may also be any shape or size, and is typically a cylindrical drum.

The dust collector comprises one or more screens or porous materials that are sufficiently porous to allow the gas to pass through while trapping or holding the swarf while it is dried. In one embodiment, the mesh size of the screen or porous materials is between about 30 to about 250, preferably between about 60 to about 100. In one embodiment, the dust collector may be flipped to convey or drop the dried swarf to the storage unit, which is typically located below the drying chamber.

The present invention also encompasses a method of recovering and drying swarf that comprises the steps of providing swarf-containing material; and contacting the swarf containing-material with a hot gas stream for a sufficient amount of time to dry the swarf to a desired moisture level. Typically, the swarf-containing material, which contains greater than 20 weight percent of water, is moved to a hopper to be metered, then conveyed to a stream of hot gas that carries it into a drying chamber having a dust collector. The stream of hot gas may flow continuously or periodically through the dust collector and vented out into the atmosphere. The dried swarf collects onto the surface of the dust collector and then conveyed to a storage area before being utilized in the manufacture of golf ball components.

The gas utilized in the stream of hot gas may be air; an inert gas, such as argon, nitrogen, helium and the like; or mixtures thereof. Preferably, the gas is air or nitrogen. The stream of hot gas may be maintained at a constant temperature or varied during the drying process. Typically, the temperature of the gas is between about 30° C. to about 120° C., preferably between about 50° C. to about 100° C., and more preferably between about 60° C. to about 80° C. The flow rate of the gas stream is typically between about 60 to about 3500 SCFM (i.e., about 100 to about 6000 m³/hour).

The recovered and dried swarf will have a moisture content below about 5.0 weight percent, preferably below about 2.5 weight percent, more preferably below about 1.0 weight percent, and most preferably below about 0.50 weight percent. In another embodiment, the moisture content of the recovered and dried swarf is between about 0.10 to about 5.0 weight percent. In another embodiment, the moisture content of the recovered and dried swarf is between about 0.25 weight percent to about 2.5 weight percent. In yet another embodiment, the moisture content of the recovered and dried swarf is between about 0.50 weight percent to about 1.0 weight percent.

The swarf-containing waste materials and swarf are contacted with the stream of hot gases for a time sufficient to dry the swarf i.e., wherein the swarf has a moisture content below the levels discussed above. In one embodiment, the swarf-containing waste materials and swarf are contacted with the stream of hot gases from between about 1 to about 72 hours. In another embodiment, the swarf-containing waste materials and swarf are contacted with the stream of hot gases from between about 12 to about 48 hours, preferably, from about 24 to about 36 hours. After recovering and drying the swarf, it may be used in preparing golf ball components. In particular, the recovered and dried swarf may be reintroduced into the beginning of the golf ball manufacturing process. For example, the swarf can be blended with conventional golf ball starting materials prior to extrusion into moldable pieces that are used to form golf ball components.

Another aspect of the present invention encompasses a method of preparing golf ball components that comprise swarf. Thus, one embodiment includes a method of manufacturing golf balls comprising:

providing a core;

optionally providing one or more intermediate layers disposed outside the core; and providing at least one cover over the core and optional intermediate layer, wherein at least one of the cover, the core, and the optional intermediate layer comprises swarf.

In one embodiment, the swarf, either alone or in combination with other typical golf ball starting materials ("swarf-containing starting material"), is subjected to high pressure, high-temperature sintering ("HPHTS") to form a new re-crosslinked swarf-containing material for use as a golf ball component. In another embodiment, high pressure initially is applied followed by applying high temperature while maintaining the high pressure. In yet another embodiment, high pressure and high temperature are applied concurrently.

High-pressure, high-temperature sintering is utilized to crosslink the swarf or swarf-containing starting material, preferably in finely ground form. Without being bound to any theory, it is believed that the pressure applied to compress the particle interfaces into intimate contact, while the temperature adds the energy needed to break the crosslink bonds. Subsequently, chemical exchange reactions can occur at the particle interface and within the particles, thereby fusing or sintering the particles in to a single piece. In particular, the inter-particle and intra-particle chemical reaction is the reforming of broken crosslinks, which results in mechanical integrity of the newly formed rubber part or item.

In one embodiment, the HPHTS includes the steps of providing swarf or swarf-containing starting material that is in fine particle form, applying a pressure sufficient to compress the particle interfaces into intimate contact followed by applying a temperature sufficient to re-crosslink the swarf or swarf-containing starting material.

In another embodiment, the swarf or swarf-containing starting material is subjected to HPHTS in a mold. The mold shape may be designed so that the final crosslinked swarf-containing product is molded into its final shape after being subjected to HPHTS. The mold shape also may be designed so that the crosslinked swarf-containing product is in an intermediate shape or form, which requires one or more subsequent steps to shape the re-crosslinked product into final form, i.e., form swarf-containing product into the desired golf ball component.

The inner cavity of the mold may have any desired shape. Typically, the inner cavity of the mold has a substantially ellipsoid, cylindrical, prismatic or cup shape. As used herein, the term "prismatic" includes shapes where the bases or ends have the same size and shape and are parallel to one another, and each of whose sides is a parallelogram. Prismatic shapes include box shapes of all types, including cubes and rectangular boxes. In addition, the mold shapes may have minor variations, for example, a prismatic or rectangular cavity can have rounded edges on at least one of its edges.

If desired, the inside of a mold cavity can be coated with a layer of material that is an anti-stick substance or low friction coating, such as TEFLON, silicone spray, or grease, before the mold is filled with swarf or swarf-containing starting material. Alternatively and additionally, the interior surfaces of the mold can be made of a polished or smooth metal, such as stainless steel. Any of the above methods, as well as methods well-known to one of ordinary skill in the art, may be used to minimize sticking of the shaped articles to the mold, facilitating easy removal of the article from the mold.

In one embodiment, the mold includes at least one piston that applies pressure to the swarf or swarf-containing starting material. The piston face may be any shape, but preferably is at least a portion of the shape of the mold. For example, a mold having an ellipsoid inner cavity shape can have a piston having a cup-shaped face. Upon applying pressure to the swarf or swarf-containing starting material that is filled to the top of the mold, the resulting crosslinked swarf-containing product has a substantially spherical shape. In another embodiment, the inner cavity of the mold is a rectangular prism having round edges on the side opposite the piston and the piston face has an equal cross-sectional area. Upon applying pressure to the swarf or swarf-containing starting material that is filled to the top of the mold, the resulting re-crosslinked product has a substantially cubic shape having rounded edges on the side opposed to the piston, which further can be rounded through traditional means to create, for example, a finished core or center for a golf ball.

In one embodiment, a core or center for a golf ball is prepared using an ellipsoid mold that is filled to the top with swarf or swarf-containing starting material, applying HPHTS sufficient to crosslink the swarf or swarf-containing starting material and forming a crosslinked swarf-containing product that is a finished, spherical core.

In another embodiment, a core layer, intermediate layer, cover layer or cover is prepared using a cup shaped mold that is filled to the top with swarf or swarf-containing starting material, applying HPHTS sufficient to crosslink the swarf or swarf-containing starting material and forming a crosslinked swarf-containing product that is a hemispherical shell, two of which may subsequently be compression molded to form a core layer, intermediate layer, cover layer or cover.

Prior to loading into a mold, swarf or swarf-containing starting material can be loaded into a cutting, grinding or shredding machine, if necessary, to convert the materials into smaller fragments. Using appropriate cutting, shredding, or grinding steps coupled with sorting devices (which typically can involve sifting the fragments through specific-sized mesh screens or panels), swarf or swarf-containing starting material can be reduced to fragments or finely ground powder having any desired size range.

In one embodiment, the swarf is fragmented or finely ground into powder having a particle size from about 5 μm to about 10000 μm. In another embodiment, the swarf has a particle size from about 20 μm to about 1000 μm. In yet another embodiment, the swarf have a particle size from about 40 μm to about 500 μm. In another embodiment, the swarf has a particle size from about 100 μm to about 250 μm. As mentioned earlier, the upper and lower limits of the ranges disclosed herein may be freely interchanged to form other new ranges that are also contemplated by the present invention. For example, the swarf has a particle size from about 5 μm to about 500 μm in one embodiment, from about 20 μm to about 100 μm in another embodiment, and from about 250 μm to about 1000 μm in yet another embodiment. This interchangeability of upper and lower limits apply to all ranges disclosed in the invention.

In another embodiment, the swarf may have a particle size distribution. Typically, sieves are used to provide the swarf having particular particle size distributions. For example, the swarf may be sieved using a vibrating standard sieve. A sieve having utilizing a +60 mesh provides the swarf having particles sizes of greater than 250 μm; a sieve having −60 mesh to +140 mesh provides swarf having particle sizes from about 100 μm to about 250 μm; and a sieve having −140 mesh to +320 mesh provides swarf having particle sizes from about 40 μm to about 100 μm.

The pressure serves several purposes, including, inter alia, ensuring that the entire mold cavity is filled, eliminating or minimizing undesired voids and air pockets that can result when the finely ground swarf or swarf-containing starting material is poured into a mold; and reducing the porosity and permeability of the resulting article, making it more solid and durable. The pressure applied to the swarf or swarf-containing starting material during HPHTS is typically greater than 50 psi, greater than 500 psi, or even greater than 1000 psi. In one embodiment, the pressure applied to the swarf or swarf-containing starting material during HPHTS is from about 50 psi to about 5,000 psi. In another embodiment, the applied pressure is from about 200 psi to about 2,500 psi. In yet another embodiment, the applied pressure is from about 500 psi to about 1,500 psi. As mentioned earlier, the upper and lower limits of the ranges may be interchanged. For example, the present invention encompasses applied pressures of from about 50 psi to about 200 psi; from about 1,500 psi to about 5,000 psi; and from about 500 psi to about 5,000 psi.

The temperature applied to the swarf or swarf-containing starting material during HPHTS varies depending on the material used. An important criteria in determining an appropriate temperature for HPHTS is consideration of the temperature at which onset of chemical stress relaxation/interchange chemistry of the crosslinking system. As used herein, the phrase "chemical stress relaxation" refers to the mechanical relaxation of stresses caused by the exchanging chemical bonds in a network. Both intermittent and continuous chemical stress relaxation yield information about the crosslink network, which undergoes changes at elevated temperatures. These techniques can be used to measure the destruction of the original network, as well as the formation of the new network at elevated temperatures.

Typically, the applied temperature is greater than about 70° C. In one embodiment, the applied temperature is from about 80° C. to about 300° C. In another embodiment, the applied temperature is from about 120° C. to about 260° C. In yet another embodiment, the applied temperature is from about 140° C. to about 200° C. and in another embodiment, the applied temperature is from about 180° C. to about 240° C. The applied temperature may be selected based on the type of material present in swarf or swarf-containing starting material in order to optimize HPHTS conditions and is readily ascertainable by one of ordinary skill in the art without undue experimentation. For example, swarf comprising a polysulfide material involves HPHTS temperatures from 130° C. to about 150° C. (applied at about 1160 psi for 1 hour) for sufficient re-crosslinking. In another example, swarf comprising natural rubber involves HPHTS temperatures from about 170° C. to about 190° C. (applied at about 1160 psi for 1 hour) for sufficient re-crosslinking. In yet another example, swarf comprising styrene-butadiene rubber involves HPHTS temperatures from about 230° C. to about 250° C. (applied at about 1160 psi for 1 hour).

The sintering time that the high pressure and high temperature is applied varies from about 1 minute to about 24 hours. In one embodiment, the high pressure and high temperature is applied for about 20 minutes to about 12 hours. In another embodiment, the high pressure and high temperature is applied for about 30 minutes to about 4 hours. In yet another embodiment, the high pressure and high temperature is applied for about 1 hour to about 2 hours. As mentioned above, the upper and lower limits of the ranges can be interchanged to form new ranges that are also contemplated in the present invention.

In one embodiment, additional ingredients may be added to the fragmented or finely ground swarf prior to HPHTS in order to promote adhesion and crosslinking of the particles. These ingredients include, but are not limited to, crosslinking agents, vulcanization accelerators, anti-reversion agents and the like, as well as mixtures thereof. In one embodiment, the additional ingredients include, but are not limited to, peroxides, sulfur and sulfur-containing compounds, zinc pentachlorothiophenol ("ZnPCTP"), acrylates, diacrylates, diisocyanates, urethane prepolymer and the like. Preferred acrylates and diacrylates include metallic salts of unsaturated fatty acids having 3 to 8 carbon atoms, including diacrylates, dimethacrylates and monomethacrylates, wherein the metal is magnesium, zinc, aluminum, sodium, lithium or nickel. Preferred anti-reversion agents include, but are not limited to, 1,3-bis-(citraconimidomethyl)benzene (PERKALINK 900 available from Flexsys of Akron, Ohio), hexamethylene-1,6-bis(thiosulfate) (DURALINK available from Flexsys).

In one embodiment, the additional ingredients are present from about 0.1 to about 50 percent by weight. In another embodiment, the additional ingredients are present from about 1 to about 20 percent by weight. In yet another embodiment, the additional ingredients are present from about 3 to about 10 percent by weight.

In another embodiment, the golf ball component can be formed using a two-step process. In particular, the first step involves providing swarf or swarf-containing starting material, compressing the swarf or swarf-containing starting material at moderately high pressures (e.g., from about 250 psi to about 500 psi) and reduced temperature (less than about 180° C.) to form a prep. Square, rectangular or cylindrical preps can be formed with sufficient fusion of particles, as described above, for ease of handling, but preps require additional pressure and/or temperature to form a crosslinked swarf-containing product into its final shape, such as a spherical core component. In another embodiment, the prep is formed into the shape of a cup, which can be later processed into a core layer, intermediate layer, cover layer or cover.

Core

The invention encompasses the use of swarf in a one-piece core or a multi-layer core. Thus, in one embodiment, a core includes swarf or swarf-containing starting material that has been crosslinked by HPHTS. In another embodiment, the core includes a blend of swarf and one or more conventional core material described below. In this embodiment, the core may be formed by providing swarf and uncrosslinked conventional core material, and subjecting the blend to HPHTS that will simultaneously crosslink the swarf and the uncrosslinked conventional core material.

As used herein, the term "core" means the innermost portion of a golf ball, and may include one or more layers. When a multi-layer core is contemplated, the core is the innermost component with one or more additional core layers disposed thereon. At least a portion of the core, typically the center, is solid, semi-solid, hollow, powder-filled or fluid-filled. As used herein, the term "fluid" means a gas, liquid, gel, paste, or the like, or a combination thereof.

Golf balls having a one-piece core or any portion of a multi-layer core that is not formed from swarf may be formed from any core material suitable for use in golf balls that is known to one of ordinary skill in the art, as discussed below. Suitable core materials include thermoset materials, such as rubber, styrene butadiene, polybutadiene, including cis-polybutadiene, trans-polybutadiene, and blends thereof, as well as cis-to-trans converted polybutadiene, isoprene, polyisoprene, trans-isoprene, as well as thermoplastics, such as ionomer resins, polyamides or polyesters, and thermoplastic and thermoset polyurethane elastomers, and any mixture thereof. In addition, suitable core materials include polyurea compositions.

A core that is not formed from swarf may also include other conventional materials, such as compositions including a base rubber, a crosslinking agent, and a density adjusting filler. The base rubber may include natural or synthetic rubbers, as well as any combination thereof. In one embodiment, the base rubber is 1,4-polybutadiene having a cis-structure of at least about 40 percent, of which natural rubber, polyisoprene rubber and/or styrene-butadiene rubber may be added thereto. The core may also include one or more cis-to-trans catalyst and a free radical source, as well as a cis-to-trans catalyst accelerator and crosslinking agent, as described above.

The core may also include a filler. This invention encompasses the use of swarf as a filler in the golf balls. Fillers added to one or more portions of the golf ball typically include processing aids or compounds to affect rheological and mixing properties, the specific gravity (i.e., density-modifying fillers), the modulus, the tear strength, reinforcement, and the like. The fillers are generally inorganic, and suitable fillers include numerous metals (including metal powders) or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Foamed polymer blends may be formed by blending ceramic or glass microspheres with polymer material. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Additional materials conventionally included in golf ball compositions may be present in the core that is not formed from swarf. These additional materials include, but are not limited to, density-adjusting fillers, coloring agents, reaction enhancers, whitening agents, UV absorbers, hindered amine light stabilizers, defoaming agents, processing aids, and other conventional additives. Stabilizers, softening agents, plasticizers, including internal and external plasticizers, impact modifiers, foaming agents, excipients, reinforcing materials and compatibilizers can also be added to any composition of the invention. All of these materials, which are well known in the art, are added for their usual purpose in typical amounts.

For example, the fillers discussed above may be added to the conventional materials to affect rheological and mixing properties, the specific gravity (i.e., density-modifying fillers), the modulus, the tear strength, reinforcement, and the like. Fillers may also be used to modify the weight of the core, e.g., a lower weight ball is preferred for a player having a low swing speed.

The golf ball components, particularly those components that do not contain swarf, may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of flip molding can be found, for example, in U.S. Pat. No. 6,096,255. A method of injection molding using a split vent pin can be found in co-pending U.S. patent application Ser. No. 09/742,435, filed Dec. 22, 2000, entitled "Split Vent Pin for Injection Molding." Examples of retractable pin injection molding may be found in U.S. Pat. Nos. 6,129,881, 6,235,230, and 6,379,138. A method of molding components for multi-layer core golf balls may be found in, for example, U.S. Pat. No. 6,290,797. Each of these molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784, 5,334,673, 5,484, 870, and 5,733,428, the disclosures of which are incorporated herein by reference in their entirety.

The cores of the invention may be formed by any suitable method known to one of ordinary skill in art. When the cores are formed from a thermoset material, compression molded is a particularly suitable method of forming the core. In a thermoplastic core embodiment, on the other hand, the cores may be injection molded.

Suitable methods include single pass mixing (ingredients are added sequentially), multi-pass mixing, and the like. The crosslinking agent, and any other optional additives used to modify the characteristics of the golf ball center or additional layer(s), may similarly be combined by any type of mixing. Suitable mixing equipment is well known to one of ordinary skill in the art, and such equipment may include a Banbury mixer, a two-roll mill, or a twin screw extruder. Suitable mixing speeds and temperatures are well-known to one of ordinary skill in the art, or may be readily determined without undue experimentation.

The mixture can be subjected to, e.g., a compression or injection molding process, and the molding cycle may have a single step of molding the mixture at a single temperature for a fixed-time duration. In one embodiment, a single-step cure cycle is employed. Although the curing time depends on the various materials selected, a suitable curing time is about 5 minutes to about 18 minutes, preferably from about 8 minutes to about 15 minutes, and more preferably from about 10 minutes to about 12 minutes. An example of a single step molding cycle, for a mixture that contains dicumyl peroxide, would hold the polymer mixture at 171° C. (340° F.) for a duration of 15 minutes. An example of a two-step molding cycle would be holding the mold at 143° C. (290° F.) for 40 minutes, then ramping the mold to 171° C. (340° F.) where it is held for a duration of 20 minutes. One of ordinary skill in the art will be readily able to adjust the curing time based on the particular materials used and the discussion herein.

Furthermore, U.S. Pat. Nos. 6,180,040 and 6,180,722 disclose methods of preparing dual core golf balls. The entire disclosures of these patents are hereby incorporated by reference herein.

Intermediate Layer

The invention encompasses the use of swarf in intermediate layers of a golf ball. Thus in one embodiment, an intermediate layer includes swarf that has been re-crosslinked by HPHTS. In another embodiment, an intermediate layer includes a blend of swarf and one or more conventional intermediate layer material described below. In this embodiment, the intermediate layer may be formed by providing swarf and uncrosslinked conventional intermediate layer material, and subjecting the blend to HPHTS that will simultaneously crosslink the swarf and the uncrosslinked conventional intermediate layer material. The materials used in such intermediate layers, as well as their method of formation, is discussed herein.

An "intermediate layer" (also known as inner layer or mantle layer) is defined herein as a portion of the golf ball that occupies a volume between the cover and the core. Such an intermediate layer may be distinguished from a cover or a core by some difference between the golf ball layers, e.g., hardness, compression, thickness, and the like. An intermediate layer may be used, if desired, with a multilayer cover or a multilayer core, or with both a multilayer cover and a multilayer core. Accordingly, an intermediate layer is also sometimes referred to in the art as an inner cover layer, as an outer core layer or as a mantle layer, i.e., any layer(s) disposed between the inner core and the outer cover of a golf ball, this layer may be incorporated, for example, with a single layer or a multilayer cover, with a one-piece core or a multilayer core, with both a single layer cover and core, or with both a multilayer cover and a multilayer core. As with the core, the intermediate layer may also include a plurality of layers. It will be appreciated that any number or type of intermediate layers may be used, as desired.

When the golf ball of the present invention includes an intermediate layer, such as an inner cover layer or outer core layer, i.e., any layer(s) disposed between the inner core and the outer cover of a golf ball, the intermediate layer can include at least one cover layer made from swarf.

Where an intermediate layer is not composed of swarf, conventional materials known to one of ordinary skill in the art may be used, including thermoplastic and thermosetting materials as discussed below.

The conventional intermediate layer can include any materials known to one of ordinary skill in the art including thermoplastic and thermosetting materials. For example, the intermediate layer may also likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of King of Prussia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

The intermediate layer also may include ionomeric materials, such as ionic copolymers of ethylene and an unsaturated monocarboxylic acid, which are available under the trademark SURLYN® of E.I. DuPont de Nemours & Co., of Wilmington, Del., or IOTEK® or ESCOR® of Exxon. These are copolymers or terpolymers of ethylene and methacrylic acid or acrylic acid totally or partially neutralized, i.e., from about 1 to about 100 percent, with salts of zinc, sodium, lithium, magnesium, potassium, calcium, manganese, nickel or the like. The carboxylic acid groups may also include methacrylic, crotonic, maleic, fumaric or itaconic acid. The salts are the reaction product of an olefin having from 2 to 10 carbon atoms and an unsaturated monocarboxylic acid having 3 to 8 carbon atoms.

The intermediate layer may also include at least one ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent.

The ionomer also may include so-called "low acid" and "high acid" ionomers, as well as blends thereof. In general, ionic copolymers including up to about 15 percent acid are considered "low acid" ionomers, while those including greater than about 15 percent acid are considered "high acid" ionomers.

Thermoplastic polymer components, such as copolyetheresters (e.g., HYTREL®, available from DuPont), copolyesteresters, copolyetheramides (e.g., PEBAX®, available from Atofina Chemicals, Inc.) elastomeric polyolefins, styrene diene block copolymers and their hydrogenated derivatives (e.g. block copolymers of styrene-butadiene-styrene, styrene-(ethylene-propylene)-styren or styrene-(ethylene-butylene)-styrene, as well as KRATON D®, KRATON G®, KRATON FG® from Shell Chemical), copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes. Examples of these materials are disclosed in U.S. Patent Application Publication Nos. 2001/0018375 and 2001/0019971, which are incorporated herein by reference in their entirety.

The ionomer compositions may also include at least one grafted metallocene catalyzed polymer. Blends of this embodiment may include about 1 pph to about 100 pph of at least one grafted metallocene catalyzed polymer and about 99 pph to 0 pph of at least one ionomer. Where the layer is foamed, the grafted metallocene catalyzed polymer blends may be foamed during molding by any conventional foaming or blowing agent. In addition, polyamides may also be blended with ionomers.

The intermediate layer may also include at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/nonionomer blends are disclosed in co-pending U.S. patent application Ser. No. 10/138,304, filed May 6, 2002, entitled "Golf Ball Incorporating Grafted Metallocene Catalyzed Polymer Blends," the entire disclosure of which is incorporated by reference herein.

Polyamide homopolymers, such as polyamide 6,18 and polyamide 6,36 may be used alone, or in combination with other polyamide homopolymers. In another embodiment, polyamide copolymers, such as polyamide 6,10/6,36, are used alone, or in combination with other polyamide homopolymers or copolymers. Other examples of suitable polyamide homopolymers and copolymers include polyamide polyamide 4, polyamide 6, polyamide 7, polyamide 11, polyamide 12 (manufactured as Rilsan AMNO by Atofina Chemicals, Inc. of King of Prussia, Pa.), polyamide 13, polyamide 4,6, polyamide 6,6, polyamide 6,9, polyamide 6,10, polyamide 6,12, polyamide 6,36, polyamide 12,12, polyamide 13,13, polyamide 6/6,6, polyamide 6,6/6,10, polyamide 6/6,T wherein T represents terephthalic acid, polyamide 6/6,6/6,10, polyamide 6,10/6,36, polyamide 66,6, 18, polyamide 66,6, 36, polyamide 6/6,18, polyamide 6/6, 36, polyamide 6/6,10/6,18, polyamide 6/6,10/6,36, polyamide 6,10/6,18, polyamide 6,12/6,18, polyamide 6,12/6,36, polyamide 6/66/6,18, polyamide 6/66/6, 36, polyamide 66/6, 10/6,18, polyamide 66/6,10/6, 36, polyamide 6/6,12/6,18, polyamide 6/6,12/6,36, and mixtures thereof.

Nonionomers suitable for blending with the polyamide include, but are not limited to, block copoly(ester) copolymers, block copoly(amide) copolymers, block copoly(urethane) copolymers, styrene-based block copolymers, thermoplastic and elastomer blends wherein the elastomer is not vulcanized (TEB), and thermoplastic and elastomer or rubber blends wherein the elastomer is dynamically vulcanized (TED). Other nonionomers suitable for blending with polyamide to form an intermediate layer composition include, but are not limited to, polycarbonate, polyphenylene oxide, imidized, amino group containing polymers, high impact polystyrene (HIPS), polyether ketone, polysulfone, poly (phenylene sulfide), reinforced engineering plastics, acrylic-styrene-acrylonitrile, poly(tetrafluoroethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(4-dodecylstyrene), poly(4-tetradecylstyrene), poly(ethylene oxide), poly (oxymethylene), poly(silazane), poly(furan tetracarboxylic acid diimide), poly(acrylonitrile), poly(methylstyrene), as well as the classes of polymers to which they belong and their copolymers, including functional comonomers, and blends thereof.

The intermediate layer may include a resilient polymer component, which is preferably used as the majority polymer in the intermediate layer to impart resilience in the cured state, and a reinforcing polymer component as a blend.

Resilient polymers suitable for use in the intermediate layer include polybutadiene, polyisoprene, styrene-butadiene, styrene-propylene-diene rubber, ethylene-propylene-diene (EPDM), mixtures thereof, and the like, preferably having a high molecular weight of at least about 50,000 to about 1,000,000.

The reinforcing polymer component preferably has a glass transition temperature ($T_G$) sufficiently low to permit mixing without initiating crosslinking, preferably between about 35° C. to 120° C. In addition, the reinforcing polymer component preferably has a sufficiently low viscosity at the mixing temperature when mixed with the resilient polymer component to permit proper mixing of the two polymer components. The weight of the reinforcing polymer relative to the total composition for forming the intermediate layer generally ranges from about 5 to 25 weight percent, preferably about 10 to 20 weight percent.

Examples of polymers suitable for use in the reinforcing polymer component include: trans-polyisoprene, block copolymer ether/ester, acrylic polyol, polyethylene, polyethylene copolymer, 1,2-polybutadiene (syndiotactic), ethylene-vinyl acetate copolymer, trans-polycyclooctenenamer, trans-isomer polybutadiene, and mixtures thereof. Particularly suitable reinforcing polymers include: HYTREL 3078, a block copolymer ether/ester commercially available from DuPont of Wilmington, Del.; a trans-isomer polybutadiene, such as FUREN 88 obtained from Asahi Chemicals of Yako, Kawasakiku, Kawasakishi, Japan; KURRARAY TP251, a trans-polyisoprene commercially available from KURRARAY CO.; LEVAPREN 700HV, an ethylene-vinyl acetate copolymer commercially available from Bayer-Rubber Division, Akron, Ohio; and VESTENAMER 8012, a trans-polycyclooctenenamer commercially available from Huls America Inc. of Tallmadge, Ohio. Some suitable reinforcing polymer components are listed in Table 1 below with their crystalline melt temperature ($T_C$) and/or $T_G$.

Another polymer particularly suitable for use in the reinforcing polymer component is a rigidifying polybutadiene component, which typically includes at least about 80 percent trans-isomer content with the remainder being cis-isomer 1,4-polybutadiene and vinyl-isomer 1,2-polybutadiene. Thus, it may be referred to herein as a "high trans-isomer polybutadiene" or a "rigidifying polybutadiene" to distinguish it from the cis-isomer polybutadienes or polybutadienes having a low trans-isomer content, i.e., typically below 80 percent, used to form the golf ball cores of the invention. The vinyl-content of the rigidifying polybutadiene component is preferably present in no more than about 15 percent, preferably less than about 10 percent, more preferably less than about 5 percent, and most preferably less than about 3 percent of the polybutadiene isomers.

The rigidifying polybutadiene component, when used in a golf ball of the invention, preferably has a polydispersity of no greater than about 4, preferably no greater than about 3, and more preferably no greater than about 2.5. The polydispersity, or PDI, is a ratio of the molecular weight average ($M_w$) over the molecular number average ($M_n$) of a polymer.

In addition, the rigidifying polybutadiene component, when used in a golf ball of the invention, typically has a high absolute molecular weight average, defined as being at least about 100,000, preferably from about 200,000 to about 1,000,000. In one embodiment, the absolute molecular weight average is from about 230,000 to about 750,000. In another embodiment, the molecular weight is about 275,000 to about 700,000. In any embodiment where the vinyl-content is present in greater than about 10 percent, the absolute molecular weight average is preferably greater than about 200,000.

When trans-polyisoprene or high trans-isomer polybutadiene is included in the reinforcing polymer component, it may be present in an amount of about 10 to about 40 weight percent, preferably about 15 to about 30 weight percent, more preferably about 15 to no more than about 25 weight percent of the polymer blend, i.e., the resilient and reinforcing polymer components.

The same crosslinking agents mentioned above with regard to the core may be used in this embodiment to achieve the desired elastic modulus for the resilient polymer—reinforcing polymer blend. In one embodiment, the crosslinking agent is added in an amount from about 1 to about 50 pph of the polymer blend, preferably about 20 to about 45 pph, and more preferably about 30 to about 40 pph, of the polymer blend.

The resilient polymer component, reinforcing polymer component, free-radical initiator, and any other materials used in forming an intermediate layer of a golf ball core in accordance with invention may be combined by any type of mixing known to one of ordinary skill in the art.

The intermediate layer may also be a tensioned elastomeric material wound around a solid, semi-solid, hollow, fluid-filled, or powder-filled center. A wound layer may be described as a core layer or an intermediate layer for the purposes of the invention. As an example, the golf ball may include a core layer, a tensioned elastomeric layer wound thereon, and a cover layer. The tensioned elastomeric material may be formed of any suitable material known to one of ordinary skill in the art.

In one embodiment, the tensioned elastomeric layer is a high tensile filament having a tensile modulus of about 10,000 kpsi or greater, as disclosed in co-pending U.S. patent application Ser. No. 09/842,829, filed Apr. 27, 2001, entitled "All Rubber Golf Ball with Hoop-Stress Layer," the entire disclosure of which is incorporated by reference herein. In another embodiment, the tensioned elastomeric layer is coated with a binding material that will adhere to the core and itself when activated, causing the strands of the tensioned elastomeric layer to swell and increase the cross-sectional area of the layer by at least about 5 percent. An example of such a golf ball construction is provided in co-pending U.S. patent application Ser. No. 09/841,910, the entire disclosure of which is incorporated by reference herein.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are disclosed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In one embodiment of the present invention, the interstitial material may extend from the intermediate layer into the core. In an alternative embodiment, the interstitial material can also be embedded in the cover, or be in contact with the inner surface of the cover, or be embedded only in the cover.

At least one intermediate layer may also be a moisture barrier layer, such as the ones described in U.S. Pat. No. 5,820,488, which is incorporated by reference herein. Any suitable film-forming material having a lower water vapor transmission rate than the other layers between the core and the outer surface of the ball, i.e., cover, primer, and clear coat. Examples include, but are not limited to polyvinylidene chloride, vermiculite, and a reaction product with fluorine gas. In one embodiment, the moisture barrier layer has a water vapor transmission rate that is sufficiently low to reduce the loss of CoR of the golf ball by at least 5 percent if the ball is stored at 100° F. and 70 percent relative humidity for six weeks as compared to the loss in CoR of a golf ball that does not include the moisture barrier, has the same type of core and cover, and is stored under substantially identical conditions.

Additional materials may be included in the intermediate layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the intermediates. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

The intermediate layer, may be formed from using any suitable method known to one of ordinary skill in the art, particularly for intermediate layers that do not include swarf. For example, an intermediate layer may be formed by blow molding and covered with a dimpled cover layer formed by injection molding, compression molding, casting, vacuum forming, powder coating, and the like.

For example, castable reactive liquid materials may be applied over the inner ball using a variety of application techniques such as spraying, compression molding, dipping, spin coating, or flow coating methods that are well known in the art. In one embodiment, the castable reactive material is formed over the core using a combination of casting and compression molding. Conventionally, compression molding and injection molding are applied to thermoplastic cover materials, whereas RIM, liquid injection molding, and casting are utilized on thermoset cover techniques.

Cover

The present invention encompasses the use of swarf in the cover or cover layers of a golf ball. Thus in one embodiment, a cover includes swarf that has been crosslinked by HPHTS. In another embodiment, the cover includes a blend of swarf and one or more conventional cover materials described below. In this embodiment, the cover may be formed by providing swarf and uncrosslinked conventional cover material, and subjecting the blend to HPHTS that will simultaneously crosslink the swarf and the uncrosslinked conventional cover material. The materials used in such cover and cover layers, as well as their method of formation, is discussed herein.

The cover provides the interface between the ball and a club. Properties that are desirable for the cover are good moldability, high abrasion resistance, high tear strength, high resilience, and good mold release, among others.

As used herein, the term "cover" means the outermost portion of a golf ball. A cover typically includes at least one layer and may contain indentations such as dimples and/or ridges. Paints and/or laminates are typically disposed about the cover to protect the golf ball during use thereof.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge or plasma treatment prior to forming the cover around it. Other layers of the ball, e.g., the core, also may be surface treated. Examples of these and other surface treatment techniques can be found in U.S. Pat. No. 6,315,915, the entirety of which is incorporated by reference herein.

Where cover or cover layer is not composed of swarf, conventional cover materials known to one of ordinary skill in the art may be used, as discussed below.

For example, the cover can include any suitable cover or cover layer materials, known to one of ordinary skill in the art, including thermoplastic and thermosetting materials, but preferably the cover or cover layer can include any suitable materials, such as ionic copolymers of ethylene and an unsaturated monocarboxylic acid which are available under the trademark SURLYN of E. I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric cover or cover layer materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of King of Prussia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E. I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer.

The cover typically has a thickness to provide sufficient strength, good performance characteristics and durability. The cover of the golf balls typically has a thickness of at least about 0.03 inches, preferably 0.03 to 0.125 inches, and more preferably from about 0.05 to 0.1 inches. The golf balls also typically have at least about 60 percent dimple coverage, preferably at least about 70 percent dimple coverage, of the surface area of the cover.

Typically, the covers are formed around the solid or wound cores by either compression molding preformed half-shells of the cover stock material or by injection molding the cover stock about the core. Half-shells are made by injection molding a cover stock into a conventional half-shell mold in a conventional manner. The preferred method is compression molding of preformed half-shells.

The cover may include a plurality of layers, e.g., an inner cover layer disposed about a golf ball center and an outer cover layer formed thereon. For example, the present invention encompasses a golf ball having a core, a thin inner cover layer, and a thin outer cover layer disposed thereon. For example, the core may be formed of a re-crosslinked product of the present invention, the inner cover layer formed of an ionomer blend, and the outer cover layer formed of a polyurea composition. In another embodiment, the outer cover layer has a different hardness than the inner cover layer.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

In one such embodiment, both covers layers can be formed of the same material and have essentially the same hardness, but the layers are designed to have different coefficient of friction values. In another embodiment, the compositions of the invention are used in a golf ball with multiple cover layers having essentially the same hardness, but different rheological properties under high deformation.

Another aspect of this embodiment relates to a golf ball with multiple cover layers having essentially the same hardness, but different thicknesses to simulate a soft outer cover over hard inner cover ball.

In another aspect of this concept, the cover layers of a golf ball have essentially the same hardness, but different properties at high or low temperatures as compared to ambient temperatures. In particular, this aspect of the invention is directed to a golf ball having multiple cover layers wherein the outer cover layer composition has a lower flexural modulus at reduced temperatures than the inner cover layer, while the layers retain the same hardness at ambient and reduced temperatures, which results in a simulated soft outer cover layer over a hard inner cover layer feel. For example, certain polyureas may have a much more stable flexural modulus at different temperatures than ionomer resins and thus, could be used to make an effectively "softer" layer at lower temperatures than at ambient or elevated temperatures.

Yet another aspect of this concept relates to a golf ball with multiple cover layers having essentially the same hardness, but different properties under wet conditions as compared to dry conditions. Wettability of a golf ball layer may be affected by surface roughness, chemical heterogeneity, molecular orientation, swelling, and interfacial tensions, among others. Thus, non-destructive surface treatments of a golf ball layer may aid in increasing the hydrophilicity of a layer, while highly polishing or smoothing the surface of a golf ball layer may decrease wettability. U.S. Pat. Nos. 5,403,453 and 5,456,972 disclose methods of surface treating polymer materials to affect the wettability, the entire disclosures of which are incorporated by reference herein. In addition, plasma etching, corona treating, and flame treating may be useful surface treatments to alter the wettability to desired conditions. Wetting agents may also be added to the golf ball layer composition to modify the surface tension of the layer.

Thus, the differences in wettability of the cover layers according to the invention may be measured by a difference in contact angle. The contact angles for a layer may be from about 1° (low wettability) to about 180° (very high wettability). In one embodiment, the cover layers have contact angles that vary by about 1° or greater. In another embodiment, the contact angles of the cover layers vary by about 3° or greater. In yet another embodiment, the contact angles of the cover layers vary by about 5° or greater.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent.

The convention cover or cover layer material may be applied over an inner ball using a variety of application techniques such as spraying, compression molding, dipping, spin coating, or flow coating methods that are well known in the art. In one embodiment, the conventional cover or cover layer material is used to form a cover over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is incorporated by reference herein, discloses a useful method for forming a polyurethane cover on a golf ball core.

For example, once the conventional cover or cover layer material is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the ball core through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to about 10 seconds. The mold halves, with core and solidified cover half thereon, are removed from the centering fixture unit, inverted and mated with second mold halves which, at an appropriate time earlier, have had a selected quantity of reacting prepolymer and curing agent introduced therein to commence gelling.

Similarly, U.S. Pat. No. 5,006,297 and U.S. Pat. No. 5,334,673 both also disclose suitable molding techniques that may be utilized to apply the castable reactive liquids employed in the present invention. However, the method of the invention is not limited to the use of these techniques; other methods known to those skilled in the art may also be employed. For instance, other methods for holding the ball core may be utilized instead of using a partial vacuum.

Dimples

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281.

In one embodiment of the present invention, the golf ball has an icosahedron dimple pattern that includes 20 triangles made from about 362 dimples and, except perhaps for the mold parting line, does not have a great circle that does not intersect any dimples. Each of the large triangles, preferably, has an odd number of dimples (7) along each side and the small triangles have an even number of dimples (4) along each side. To properly pack the dimples, the large triangle has nine more dimples than the small triangle. In another embodiment, the ball has five different sizes of dimples in total. The sides of the large triangle have four different sizes of dimples and the small triangles have two different sizes of dimples.

In another embodiment of the present invention, the golf ball has an icosahedron dimple pattern with a large triangle including three different dimples and the small triangles having only one diameter of dimple. In a preferred embodiment, there are 392 dimples and one great circle that does not intersect any dimples. In another embodiment, more than five alternative dimple diameters are used.

In one embodiment of the present invention, the golf ball has an octahedron dimple pattern including eight triangles made from about 440 dimples and three great circles that do not intersect any dimples. In the octahedron pattern, the pattern includes a third set of dimples formed in a smallest triangle inside of and adjacent to the small triangle. To properly pack the dimples, the large triangle has nine more dimples than the small triangle and the small triangle has nine more dimples than the smallest triangle. In this embodiment, the ball has six different dimple diameters distributed over the surface of the ball. The large triangle has five different dimple diameters, the small triangle has three different dimple diameters and the smallest triangle has two different dimple diameters.

Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated by reference herein.

The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer.

In an alternative embodiment, the golf ball may have a non-planar parting line allowing for some of the plurality of pyramidal projections to be disposed about the equator. Such a golf ball may be fabricated using a mold as disclosed in co-pending U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections.

Several additional non-limiting examples of dimple patterns with varying sizes of dimples are also provided in U.S. Pat. No. 6,358,161 and U.S. Pat. No. 6,213,898, the entire disclosures of which are incorporated by reference herein.

The total number of dimples on the ball, or dimple count, may vary depending on such factors as the dimple size and the selected pattern. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, is contemplated for use with the golf balls of the present invention.

Golf Ball Post-Processing

The golf balls of the present invention may be painted, coated, or surface treated for further benefits.

For example, golf balls covers frequently contain a fluorescent material and/or a dye or pigment to achieve the desired color characteristics. A golf ball of the invention may also be treated with a base resin paint composition, however, as disclosed in U.S. Patent Publication No. 2002/0082358, which includes a 7-triazinylamino-3-phenylcoumarin derivative as the fluorescent whitening agent to provide improved weather resistance and brightness.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. patent application Ser. No. 10/012,538, filed Dec. 12, 2001, entitled, "Method of Forming Indicia on a Golf Ball," the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, the entirety of which is incorporated by reference herein.

Protective and decorative coating materials, as well as methods of applying such materials to the surface of a golf ball cover, are well known in the golf ball art. Generally, such coating materials include urethanes, urethane hybrids, epoxies, polyesters and acrylics. If desired, more than one coating layer can be used. The coating layer(s) may be applied by any suitable method known to one of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.700 to about 1.950 inches can be used. Preferably, the overall diameter of the core and all intermediate layers is about 80 percent to about 98 percent of the overall diameter of the finished ball.

The core may have a diameter ranging from about 0.090 inches to about 1.650 inches. In one embodiment, the diameter of the core of the present invention is about 1.200 inches to about 1.630 inches. In another embodiment, the diameter of the core is about 1.300 inches to about 1.600 inches, preferably from about 1.390 inches to about 1.600 inches, and more preferably from about 1.500 inches to about 1.600 inches. In yet another embodiment, the core has a diameter of about 1.550 inches to about 1.650 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.540 inches or greater, preferably about 1.550 inches or greater. In one embodiment, the core diameter is about 1.590 inches or greater. In another embodiment, the diameter of the core is about 1.640 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer is between about 0.02 inches to about 0.045 inches. In still another embodiment, the outer cover layer is about 0.025 to about 0.04 inches thick. In one embodiment, the outer cover layer is about 0.03 inches thick.

In embodiments where the cover, intermediate layer or core layer comprises swarf, a hemispherical shell is typically formed first. The hemispherical shell generally has an outer radius of from about 0.45 inches to about 0.900 inches and a thickness from about 0.001 inches to about 0.500 inches. The outer radius and thickness varies depending on whether the hemispherical shell is formed for a cover, intermediate layer or a core layer, as disclosed herein.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

The molding process and composition of golf ball portions typically results in a gradient of material properties. Methods employed in the prior art generally exploit hardness to quantify these gradients. Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240-00 and generally involves measuring the hardness of a flat "slab" or "button" formed of the material of which the hardness is to be measured. Generally, ASTM-D2240-00 requires calibration of durometers, which have scale readings from 0 to 100. However, readings below 10 or above 90 are not considered reliable, as noted in ASTM-D2240-00, and accordingly, all the hardness values herein are within this range. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C. It should also be understood that the two measurement techniques are not linearly related and, therefore, one hardness value cannot easily be correlated to the other.

The swarf-containing products of the present invention have a material hardness from about 20 Shore D to about 90 Shore D, preferably from about 20 Shore D to about 80 Shore D, more preferably from about 25 Shore D to about 75 Shore D.

The cores of the present invention may have varying hardnesses, i.e., surface hardness, depending on the particular golf ball construction, as well as whether it is formed from swarf, conventional core materials or a combination thereof. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. In another embodiment, the core has a hardness of about 20 Shore C to about 90 Shore C, and preferably from about 30 Shore C to about 90 Shore C. In yet another embodiment, the core has a hardness of about 20 Shore C to about 80 Shore D, preferably from about 20 Shore D to about 70 Shore D. Preferably, the core has a hardness about 30 to about 65 Shore D, and more preferably, the core has a hardness about 35 to about 60 Shore D. As mentioned above, the upper and lower limits of the ranges disclosed herein are interchangeable to form new ranges. For example, the hardness of the core may be from about 20 Shore D to about 80 Shore D, or 50 Shore A to about 65 Shore D.

The core may have a hardness gradient, i.e., a first hardness at a first point, i.e., at an interior location, and a second hardness at a second point, i.e., at an exterior surface, as measured on a molded sphere. In one embodiment, the second hardness is at least about 6 percent greater than the first hardness, preferably about 10 percent greater than the first hardness. In other embodiments, the second hardness is at least about 20 percent greater or at least about 30 percent greater, than the first hardness.

For example, the interior of the core may have a first hardness of about 45 Shore C to about 60 Shore C and the exterior surface of the core may have a second hardness of about 65 Shore C to about 75 Shore C. In one golf ball formulated according to the invention, the first hardness was about 51 Shore C and a second hardness was about 71 Shore C, providing a hardness difference of greater than 20 percent.

In one embodiment, however, the core has a substantially uniform hardness throughout. Thus, in this aspect, the first and second hardness preferably differ by about 5 percent or less, more preferably about 3 percent or less, and even more preferably by about 2 percent or less. In another embodiment, the hardness is uniform throughout the component.

The intermediate layer(s) of the present invention may also vary in hardness depending on the specific construction of the ball, as well as whether it is formed from swarf, conventional intermediate layer materials, or a combination thereof. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 40 Shore D or greater, preferably about 50 Shore D or greater. In one embodiment, the intermediate layer hardness is from about 30 Shore D to about 90 Shore D, and preferably from about 45 Shore D to about 80 Shore D. In another embodiment, the intermediate layer hardness is from about 50 Shore D to about 70 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In one embodiment, the cover has a hardness of about 20 Shore A to about 70 Shore D. In another embodiment, the cover itself has a hardness from about 30 Shore D to about 60 Shore D. In one embodiment, the cover has a hardness of about 40 Shore D to about 65 Shore D. In another embodiment, the cover has a hardness less than about 45 Shore D, preferably less than about 40 Shore D, and more preferably about 25 Shore D to about 40 Shore D. In yet another embodiment, the cover hardness is from about 35 to 80 Shore D, preferably from about 45 to 70 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Depending on the desired properties, balls prepared according to the invention can exhibit substantially the same or higher resilience, or coefficient of restitution (CoR), with a decrease in compression or modulus, compared to balls of conventional construction. As used herein, the term "coefficient of restitution" (CoR) is calculated by dividing the rebound velocity of the golf ball by the incoming velocity when a golf ball is shot out of an air cannon. The CoR testing is conducted over a range of incoming velocities and determined at an inbound velocity of 125 ft/s. Additionally, balls prepared according to the invention can also exhibit substantially higher resilience, or coefficient of restitution (CoR), without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is a golf ball core. The golf ball material preferably has a loss tangent below about 0.1 at −50° C., and more preferably below about 0.07 at −50° C.

The resultant golf balls typically have a coefficient of restitution of about 0.7 or more. In another embodiment, the ball has a COR of about 0.75 or more, and more preferably is about 0.78 or more. In another embodiment, the golf ball has a CoR from about 0.7 to about 0.815. In yet another embodiment, the ball has a CoR of about 0.79 or more, and more preferably is about 0.8 or more. Additionally, in each of these embodiments it is also preferred that the COR of the ball is less than about 0.819. Alternatively, the maximum COR of the ball is one that does not cause the golf ball to exceed initial velocity requirements established by regulating entities such as the USPGA.

The golf balls also typically have an Atti compression (which has been referred to as PGA compression in the past) of at least about 40, preferably from about 50 to 120, and more preferably from about 60 to 100. As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball core. Compression values are dependent on the diameter of the article being measured. The golf ball polybutadiene material typically has a flexural modulus of from about 500 psi to 300,000 psi, preferably from about 2000 to 200,000 psi. The golf ball polybutadiene material typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material. The dynamic shear storage modulus, or storage modulus, of the golf ball polybutadiene material at about 23° C. is typically at least about 10,000 dyn/cm$^2$, preferably from about $10^4$–$10^{10}$ dyn/cm$^2$, more preferably from about $10^6$ to $10^{10}$ dyn/cm$^2$.

Compression values are dependent on the diameter of the component being measured. The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to one of ordinary skill in the art, however, the cores generated according to the present invention may be below the measurement of the Atti Compression Gauge. In an embodiment where the core is hard, the compression may be about 90 or greater. In one embodiment, the compression of the hard core ranges from about 90 to about 100.

The core of the present invention may also have a Soft Center Deflection Index (SCDI) compression of less than about 160, more preferably, between about 40 and about 160, and most preferably, between about 60 and about 120.

Initial Velocity and CoR

The present invention encompasses golf balls that conform and meet with USGA initial velocity requirements. There is currently no USGA limit on the CoR of a golf ball, but the initial velocity of the golf ball cannot exceed the current USGA limit of 250±5 feet/second (ft/s). Thus, in one embodiment, the initial velocity is about 245 ft/s or greater and about 255 ft/s or less. In another embodiment, the initial velocity is about 250 ft/s or greater. In another embodiment, the initial velocity is about 253 ft/s to about 254 ft/s. While the current rules on initial velocity require that golf ball manufacturers stay within the limit, one of ordinary skill in the art would appreciate that the golf ball of the invention would readily convert into a golf ball with initial velocity outside of this range. For golf balls intended for use as practice balls, the initial velocity may be below 250 ft/s, and even below 240 ft/s.

As a result, of the initial velocity limitation set forth by the USGA, the goal is to maximize CoR without violating the 255 ft/s limit. In a one-piece solid golf ball, the CoR will depend on a variety of characteristics of the ball, including its composition and hardness. For a given composition, CoR will generally increase as hardness is increased. In a two-piece solid golf ball, e.g., a core and a cover, one of the purposes of the cover is to produce a gain in CoR over that of the core. When the contribution of the core to high CoR is substantial, a lesser contribution is required from the cover. Similarly, when the cover contributes substantially to high CoR of the ball, a lesser contribution is needed from the core.

The present invention encompasses golf balls that have a CoR from about 0.7 to about 0.85. In one embodiment, the CoR is about 0.75 or greater, preferably about 0.78 or greater. In another embodiment, the ball has a CoR of about 0.8 or greater.

In addition, the inner ball preferably has a CoR of about 0.780 or more. In one embodiment, the CoR is about 0.790 or greater.

Flexural Modulus

Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover on the golf balls, as measured by ASTM method D-6272-98, is typically greater than about 500 psi, and is preferably from about 500 psi to about 150,000 psi. The flexural moduli of the cover layer is preferably about 2,000 psi or greater, and more preferably about 5,000 psi or greater. In one embodiment, the flexural moduli of the cover is from about 10,000 psi to about 150,000 psi, more preferably from about 15,000 psi to about 120,000 psi, and most preferably from about 18,000 psi to about 110,000 psi. In another embodiment, the flexural moduli of the cover layer is about 100,000 psi or less, preferably about 80,000 or less, and more preferably about 70,000 psi or less. In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer including the compositions of the invention is preferably at least about 0.7. In another embodiment, the specific gravity of a cover or intermediate layer including the compositions of the invention is at least about 0.6. In yet another embodiment, the specific gravity of the cover or intermediate layer is at last about 1.0, preferably at least about 0.9 and more preferably at least about 0.8.

The specific gravity of a core including the compositions of the invention is greater than 1.5, more preferably greater than 1.8 and more preferably greater than 2.0. In another embodiment, the specific gravity of the fore including the compositions of the invention is greater than 2.5, and can be as high as 5.0 and 10.0.

Ball Spin

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist Pinnacle Gold golf ball that gives a ball speed of about 159 to about 161 miles/hour, a launch angle of about 9.0 degrees to about 10.0 degrees, and a spin rate of about 2900 rpm to about 3100 rpm. Thus in one embodiment, the spin rate of a golf ball hit with a golf club driver under the same test conditions is between about 1200 rpm to about 4000 rpm. In a preferred embodiment, the spin rate of a golf ball hit with a golf club driver is between about 2000 rpm to about 3500 rpm, more preferably between about 2500 and 3000 rpm.

For an 8-iron ball spin test, a spin rate of a golf ball struck by a standard 8-iron club was obtained by using test conditions for a Titleist Pro VI golf ball that gives a ball speed of about 114 to about 116 miles/hour, a launch angle of about 18.5 to about 19.5 degrees and a spin rate of about 8100 rpm to about 8300 rpm. Thus in one embodiment, the spin rate of an average, cleanly struck 8-iron shot is between 6500 rpm and 10,000 rpm. In preferred embodiment, the spin rate of an average, cleanly struck 8-iron shot under the same test conditions is between 7500 rpm and 9500 rpm, more preferably between about 8000 rpm and 9000 rpm.

We claim:

1. A method of manufacturing a golf ball comprising the steps of:
   providing swarf-containing material;
   contacting the swarf containing-material with a stream of hot gas for a sufficient amount of time to dry the swarf-containing material to a desired moisture level;
   forming at least one of a golf ball core, intermediate layer, or cover with about 0.01 to about 100 weight percent of the swarf-containing material.

2. The method of claim 1, wherein the swarf-containing material comprises a thermoset material.

3. The method of claim 1, wherein the step of contacting the swarf-containing material further comprises moving the swarf-containing material to a hopper to be metered and conveying the swarf-containing material to a stream of hot gas that carries the swarf-containing material into a drying chamber having a dust collector to produce dried swarf.

4. The method of claim 3, wherein the stream of hot gas may flow continuously or periodically through the dust collector and vented out into the atmosphere.

5. The method of claim 3, wherein the step of conveying further comprises collecting the dried swarf on the surface of the dust collector and conveying the dried swarf to a storage area before using the dried swarf in the manufacture of golf ball components.

6. The method of claim 1, wherein the stream of hot gas comprises air, an inert gas, or mixtures thereof.

7. The method of claim 6, wherein the inert gas comprises nitrogen, argon, helium or a mixture thereof.

8. The method of claim 1, wherein the temperature of the stream of hot gas is between about 30° C. to about 120° C.

9. The method of claim 1, wherein the stream of hot gas has a flow rate of between about about 100 to about 6000 m³/hour.

10. The method of claim 1, wherein the step of contacting the swarf-containing material comprises contacting the swarf-containing materials with a stream of hot gas for a period of time of about 1 to about 72 hours.

11. The method of claim 10, wherein the period of time is about 12 to about 48 hours.

12. The method of claim 3, wherein the dried swarf has a moisture content below about 5.0 weight percent.

13. The method of claim 12, wherein the dried swarf has a moisture content of below about 0.50 weight percent.

* * * * *